United States Patent [19]
Hirota et al.

[11] Patent Number: 5,604,825
[45] Date of Patent: Feb. 18, 1997

[54] IMAGE PROCESSING APPARATUS CAPABLE OF VARYING MAGNIFICATION OF IMAGES AND METHOD OF USING SAME

[75] Inventors: Yoshihiko Hirota; Katsuaki Tajima, both of Toyokawa, Japan

[73] Assignee: Minolta Camera Kabushiki Kaisha, Osaka, Japan

[21] Appl. No.: 226,368

[22] Filed: Apr. 12, 1994

Related U.S. Application Data

[63] Continuation of Ser. No. 799,152, Nov. 27, 1991, abandoned.

[30] Foreign Application Priority Data

Nov. 30, 1990 [JP] Japan .................................. 2-337735
May 29, 1991 [JP] Japan .................................. 3-155756

[51] Int. Cl.⁶ .............................. G06T 3/40; G06T 5/20
[52] U.S. Cl. .......................... 382/261; 382/298; 358/451
[58] Field of Search .............................. 382/47, 54, 41, 382/261, 275, 298–299, 301; 358/451, 455, 454, 461, 447

[56] References Cited

U.S. PATENT DOCUMENTS

| | | | |
|---|---|---|---|
| 4,275,450 | 6/1981 | Potter | 382/47 |
| 4,698,778 | 10/1987 | Ito et al. | 358/451 |
| 4,860,118 | 8/1989 | Arimoto | 358/451 |
| 4,878,126 | 10/1989 | Ichikawa | 358/451 |
| 5,134,503 | 7/1992 | Kimura | 358/447 |
| 5,166,810 | 11/1992 | Sorimachi et al. | 358/451 |

FOREIGN PATENT DOCUMENTS 2170373  7/1986  United Kingdom .

Primary Examiner—Leo Boudreau
Assistant Examiner—Larry J. Prikockis
Attorney, Agent, or Firm—Burns, Doane, Swecker & Mathis, LLP

[57] ABSTRACT

The present invention relates to an image processing apparatus for carrying out a variable scale magnification processing for contracting or enlarging an original image. The image processing apparatus including a variable scale moving unit for increasing pixels in accordance with a variable scale magnification in order to enlarge the original image includes a smoothing processing unit for smoothing pixel data. The smoothing processing unit detects the number of increased pixels for each pixel by an increased pixel number determining unit, so as to smooth image data output from the variable scale magnification moving unit by employing smoothing filters of a matrix size selected in accordance with the result of the detection. This results in an image processing apparatus that can prevent a degradation in image quality by an appropriate smoothing processing independently of whether a variable scale magnification in enlargement is integer or not.

15 Claims, 13 Drawing Sheets

400 CLOCK GENERATING CKT

FIG. 6

JT DETERMINATION TABLE

| j-3 | j-2 | j-1 | j | j+1 | j+2 | j+3 | OVERLAPPED PIXEL NUMBER | M P X | MATRIX SIZE |
|---|---|---|---|---|---|---|---|---|---|
| = | = | = | j | = | = | = | 7 | | |
| ≠ | = | = | j | = | = | = | 6 | 3 | 1 x 7 |
| = | = | = | j | = | = | ≠ | 6 | | |
| ≠ | = | = | j | = | = | ≠ | 5 | | |
| = | = | = | j | = | ≠ | - | 5 | | |
| - | ≠ | = | j | = | = | = | 5 | | |
| ≠ | = | = | j | = | ≠ | - | 4 | 2 | 1 x 5 |
| - | ≠ | = | j | = | = | ≠ | 4 | | |
| = | = | = | j | ≠ | - | - | 4 | | |
| - | - | ≠ | j | = | = | = | 4 | | |
| - | ≠ | = | j | = | ≠ | - | 3 | | |
| ≠ | = | = | j | ≠ | - | - | 3 | | |
| - | - | ≠ | j | = | = | ≠ | 3 | 1 | 1 x 3 |
| - | ≠ | = | j | ≠ | - | - | 2 | | |
| - | - | ≠ | j | = | ≠ | - | 2 | | |
| OTHER COMBINATIONS | | | | | | | 1 | 0 | 1 x 1 |

IMAGE PROCESSING APPARATUS CAPABLE OF VARYING MAGNIFICATION OF IMAGES AND METHOD OF USING SAME

This application is a continuation of application Ser. No. 07/799,152, filed Nov. 27, 1991, now abandoned.

BACKGROUND OF THE INVENTION

1. Field of the Invention

The present invention relates generally to image processing apparatuses for carrying out a variable scale magnification processing for contracting or enlarging an original image and, more particularly, to an image processing apparatus having data corrected in enlargement of the original image.

2. Description of the Related Art

A digital copier, for example, incorporates an image processing apparatus for adding a variable scale magnification processing in accordance with a copying magnification set via an operation panel to image data that is read by dividing an original for each pixel.

In general, as variable scale magnification processing, such a processing is carried out that pixel data (which are, strictly speaking, information indicating the shade or tone of the pixels, hereinafter referred to as "pixel") are skipped in contracting an original image and that the pixels are increased in enlarging the original image.

More specifically, in the variable scale magnification processing, with the direction of variable scale magnification determined as a main scanning direction for reading, if variable scale magnification is, e.g., "0.5", every other pixels arranged in the main scanning direction are skipped. If variable scale magnification is "3", the pixels are increased so that the same pixels are arranged three by three in the main scanning direction.

In the specification, the number of increased pixels indicates the total number of pixels of the same density arranged by the variable scale magnification processing. Therefore, when the same four pixels including three pixels added to the original pixel are arranged, for example, the number of increased pixels is "4".

It is known that if an image is enlarged by the above-described variable scale magnification processing, image definition becomes degraded as an enlargement magnification becomes increased.

That is to say, when pixels of different densities are adjacent to each other, discontinuity of darker and lighter shades is distinct if darker shade pixels and lighter shade pixels are increased with each other. This deteriorates the tone of an enlarged image. In particular, when image data undergoes an edge emphasis processing for making contours such as characters or letters clear, the pixels between darker shade and lighter shade are of extremely lighter shade.

Thus, the image data subjected to variable scale magnification processing is normally subject to a smoothing processing for shading off the darker shade and the lighter shade. The density of each pixel is converted into an added average density of plural pixels corresponding to smoothing filters of predetermined matrix sizes by the smoothing processing, thereby suppressing a degradation in the tone of the enlarged image. If the matrix size of the smoothing filters is determined to be uniform in such a smoothing processing, the smoothing of densities is not achieved in accordance with magnification of enlargement (variable scale magnification). As the degree of smoothing becomes excessive, the resolution of images becomes decreased.

Accordingly, as disclosed in Japanese Patent Laying-Open No. 63-209274, a conventional image processing apparatus is structured such that smoothing filters of different matrix sizes are properly used dependently on magnifications in order to achieve an optimal smoothing processing.

If magnification is not integral number such as "2", "3", "4". . . but decimal number such as "1.4" or "3.5", the number of increased pixels is not uniform in variable scale magnification processing.

That is, if the magnification is "3.5", an image is enlarged by 3.5 times in a false manner in the variable scale magnification processing in which the number of increased pixels is, e.g., "3" for odd pixels and "4" for even pixels.

Conventionally, however, an optimal smoothing filter is selected in accordance with a designated magnification; however, the matrix size of smoothing filters (hereinafter referred to as "filter size") is uniquely determined with respect to the magnification. More specifically, all pixels are subject to an uniform smoothing processing by a single selected smoothing filter.

Thus, when variable scale magnification is decimal, there are such disadvantages that the filter size in smoothing processing is excessively large with respect to a smaller number of increased pixels and that the filter size is excessively small with respect to a larger number of increased pixels. In other words, there is a problem that smoothing is not achieved dependently on the number of increased pixels, thereby degrading the tone or resolution of an enlarged image.

SUMMARY OF THE INVENTION

One object of the present invention is therefore to prevent a degradation in image quality irrespective of variable scale magnification of an image in an image processing apparatus.

Another object of the present invention is to keep the tone of an enlarged image constant in an image processing apparatus.

A further object of the present invention is to carry out an optimal smoothing processing in accordance with magnification in an image processing apparatus.

A still further object of the present invention is to carry out an appropriate smoothing processing even if magnification is not integral times in an image processing apparatus.

A still further object of the present invention is to provide an image processing method in which a degradation in image quality can be prevented irrespective of variable scale magnification of an image.

Still another object of the present invention is to provide an image processing method in which an optimal smoothing processing is enabled in accordance with magnification.

The foregoing objects of the present invention are achieved by the following elements incorporated in an image processing apparatus for processing image data including a plurality of pixel data. That is, the image processing apparatus according to the present invention includes: an enlarging unit for enlarging an image by increasing a plurality of pixel data with each other; and a smoothing unit for smoothing each of the increased image data by employing a predetermined smoothing filter. The smoothing unit changes smoothing filters to be used in accordance with the number of increased pixels of each pixel data to be smoothed.

Since the smoothing filters of the smoothing unit are changed in accordance with the number of pixel data increased by the enlarging unit, a degradation in image quality can be avoided irrespective of variable scale magnification of an image in the image processing apparatus.

According to another aspect of the present invention, an image processing apparatus for processing image data including a plurality of pixel data includes: an enlarging unit for enlarging an image by increasing the plurality of pixel data; and a smoothing unit for smoothing pixel data by employing a predetermined smoothing filter which can refer to pixel data corresponding to a plurality of peripheral pixels. The smoothing unit changes the number of pixels that is referred to by smoothing filters in accordance with the number of increased pixel data. Since the number of pixels referred to by the smoothing filters is changed in accordance with the number of pixel data increased by the enlarging unit, an optimal smoothing processing in accordance with magnification is carried out in the image processing apparatus.

According to still another aspect of the present invention, an image processing method in which image data including a plurality of pixel data is enlarged at an arbitrary enlarging rate includes the steps of: repetitively increasing respective pixels of respective pixel data by the number corresponding to an enlarging rate; detecting the number of respective increased pixel data for each pixel data included in the image data; and correcting pixel data by reference to pixel data corresponding to peripheral pixels corresponding in number to the result of the detection. The number of increased pixels corresponding to the enlarging rate of respective pixel data is detected for each pixel data, and the pixel data is corrected by reference to the pixel data corresponding in number to the detected number of increased pixels. This enables provision of an image processing method in which a degradation in image quality can be avoided irrespective of magnification of an image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing the contents of a determination table.

DESCRIPTION OF THE PREFERRED EMBODIMENTS

Figure 7:
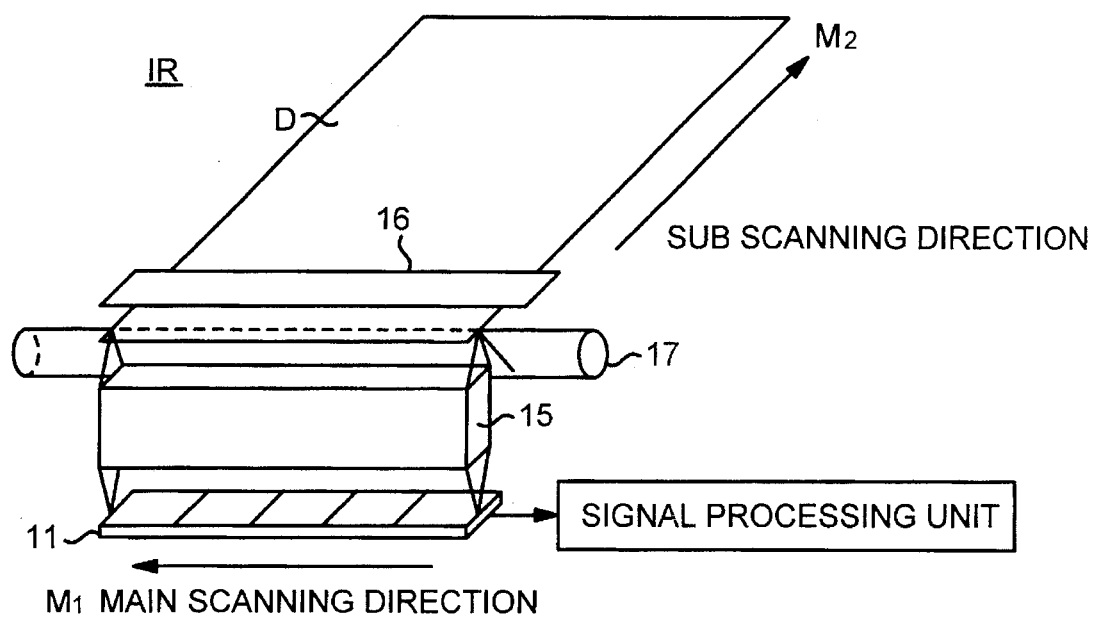
FIG. 7 is a perspective view schematically showing a major part of an image reader unit according to the present invention.

A description will now be made on a major part of an image reader unit IR with reference to FIG. 7.

Image reader unit IR is incorporated as means for reading an original D in a digital copier. A color copied image is formed by an electrophotographic process in a laser printer unit (not shown) in response to an output of image reader unit IR.

Original D placed on a platen glass (not shown) is read to be fractionized into pixels and divided into three primary colors of red (R), green (G) and blue (B) by an optical system moving in the arrowed direction of M2 (subscanning direction).

The optical system includes an exposure lamp 17 for illuminating original D, an image sensor 11 disposed in a main scanning direction (the arrowed direction of M1), a rod lens array 15 and the like. A photoelectric conversion output of image sensor 11 is transmitted to a signal processing unit 100. A white plate 16 of a uniform density to be a white reference image is disposed on an original cover (not shown) covering the platen glass.

Figure 8:
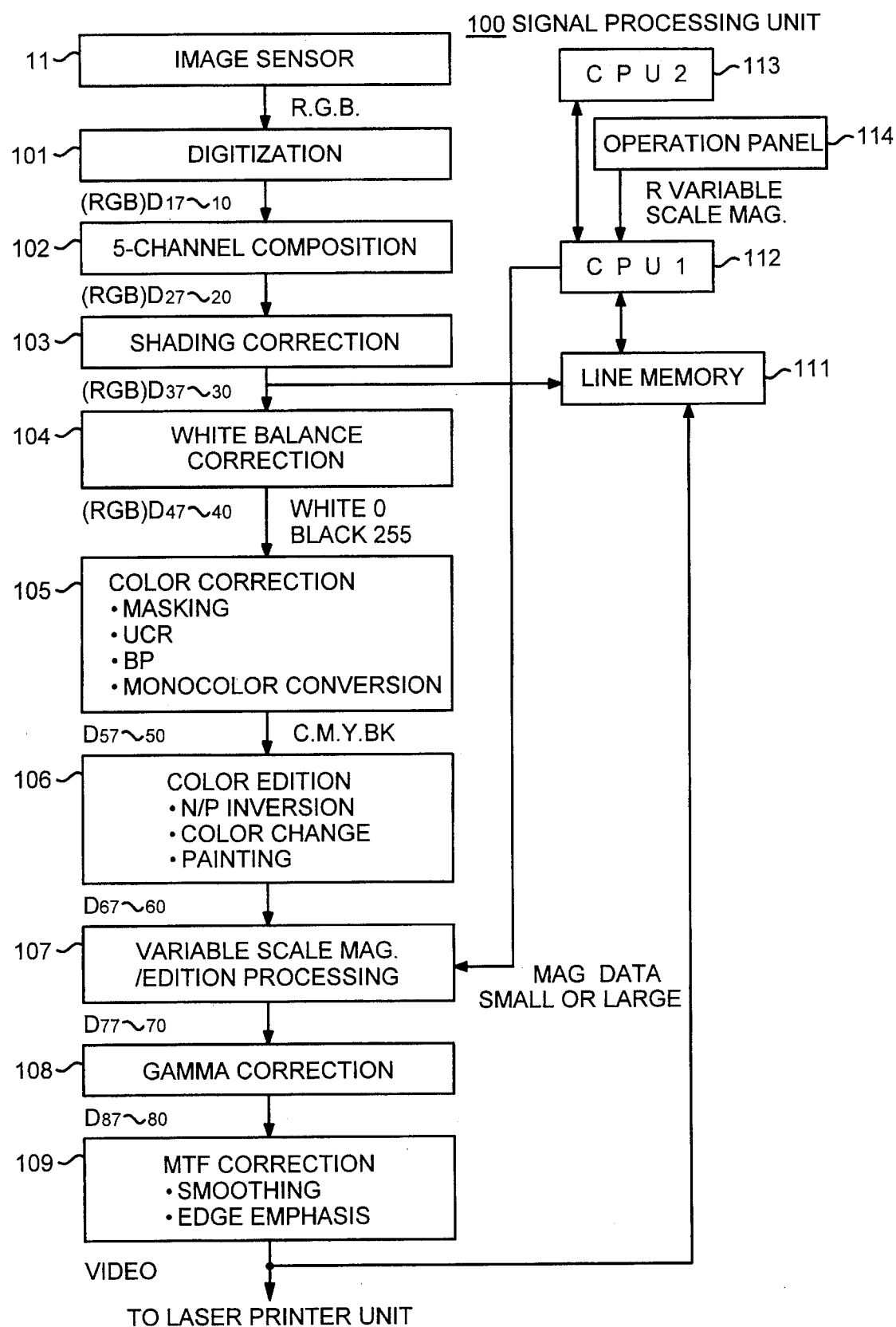
FIG. 8 is a block diagram of a signal processing unit of FIG. 7.

FIG. 8 is a block diagram of signal processing unit 100.

In image sensor 11, five CCD chips are simultaneously driven in order to enhance a reading speed in the main scanning direction, so that valid reading pixel signals corresponding to 2880 pixels in the total of R, G and B are serially output in turn from the respective CCD chips.

A photoelectric conversion output serially output from image sensor 11 is quantized by a sample and hold circuit and an A/D converter in a digitizing circuit 101, then converted into image data D17-10 of 8 bits (256 tones) and input to a 5-channel composite circuit 102.

Since the photoelectric conversion output is proportional to the intensity of reflected light from original D, the value of image data D17-10 is "255" for pixels in a lightest-shade white part of original D and "0" for pixels in a darkest-shade black part thereof.

5-channel composite circuit 102 once stores image data D17-10 into 15 (5×3) first-in first-out memories (FIFO memories) in total for each CCD chip and for each color (R, G, B), then sequentially selects and reads image data D17-10 from each chip in the cycle of 2 lines, and outputs image data D27-20 for each color as a serial image signal corresponding to the order of arranging pixels (the order of reading and scanning).

A shading correction circuit 103 subjects image data D27-20 of each color to a correction corresponding to differences in sensitivity between the respective pixels and light intensity distribution (unevenness in quantity of light) of exposure lamp 17 in the main scanning direction.

A white balance correction circuit 104 adjusts relative ratios between the respective colors so as to be able to form a copied image of a correct tone, then logarithmically reduces image data D37-30 being a data signal proportional to the intensity of reflected light in accordance with a visual property in consideration of the range of reading original D, and outputs image data D47-40 being density data proportional to the density of original D.

That is, the value of image data D47-40 is "0" for the pixels in the lightest-shade white part of original D and "255" for those in the darkest-shade black part thereof.

A color correction circuit 105 carries out a masking processing for generating density data corresponding to three primary colors of Y, M and C of toner for printing from density data corresponding to each color of R, G and B and a UCR processing for generating density data corresponding to Bk (black).

A color editing circuit 106 carries out a processing for three types of color image edition such as negative/positive inversion, color change and painting.

A variable scale magnification/edition processing circuit 107 is a circuit to be a feature of the present invention. Circuit 107 carries out a processing for changing the output timing and the output sequence of data in order to form a variable-scale magnified image and a moving edited image and also carries out a smoothing processing for particularly enhancing the image quality of an enlarged image.

A gamma correction circuit 108 carries out a gamma correction based on background color and density gradation of original D. An MTF correction circuit 109 carries out a smoothing processing for preventing occurrence of Moiré fringe and an edge emphasis processing for eliminating edge loss, or the like and outputs an image signal VIDEO to the laser printer unit.

A line memory 111 for storing image data in a specific processing stage and a second CPU 113 for controlling exposure lamp 17, various types of motors or the like are connected to a first CPU (Central Processing Unit) 112 for controlling each circuit.

First CPU 112 is connected with an operation panel 114 for carrying out an input for setting or instructing variable scale magnifications and other various parameters, a display of an operation state of the copier, and the like.

When a variable scale magnification R is input from operation panel 114 to first CPU 112, CPU 112 calculates, in accordance with variable scale magnification R, a variable scale magnification control signal S/L indicating contraction or enlargement and magnification data (MAG·DATA) necessary for actually executing a variable scale magnification processing. The result of the calculation is output to a clock generating circuit 400, which will be described later, provided in a variable scale magnification/moving unit 71 in variable scale magnification/edition processing circuit 107.

When a maximum value of an adder 451 which will be described later is "4095", MAG·DATA is evaluated by the following equations (1) and (2).

For enlargement or equal scale magnification:

$$\text{MAG·DATA} = 4096 \div \text{variable scale magnification R} \qquad (1)$$

For contraction:

$$\text{MAG·DATA} = 4096 \times \text{variable scale magnification R} \qquad (2)$$

Figure 1:
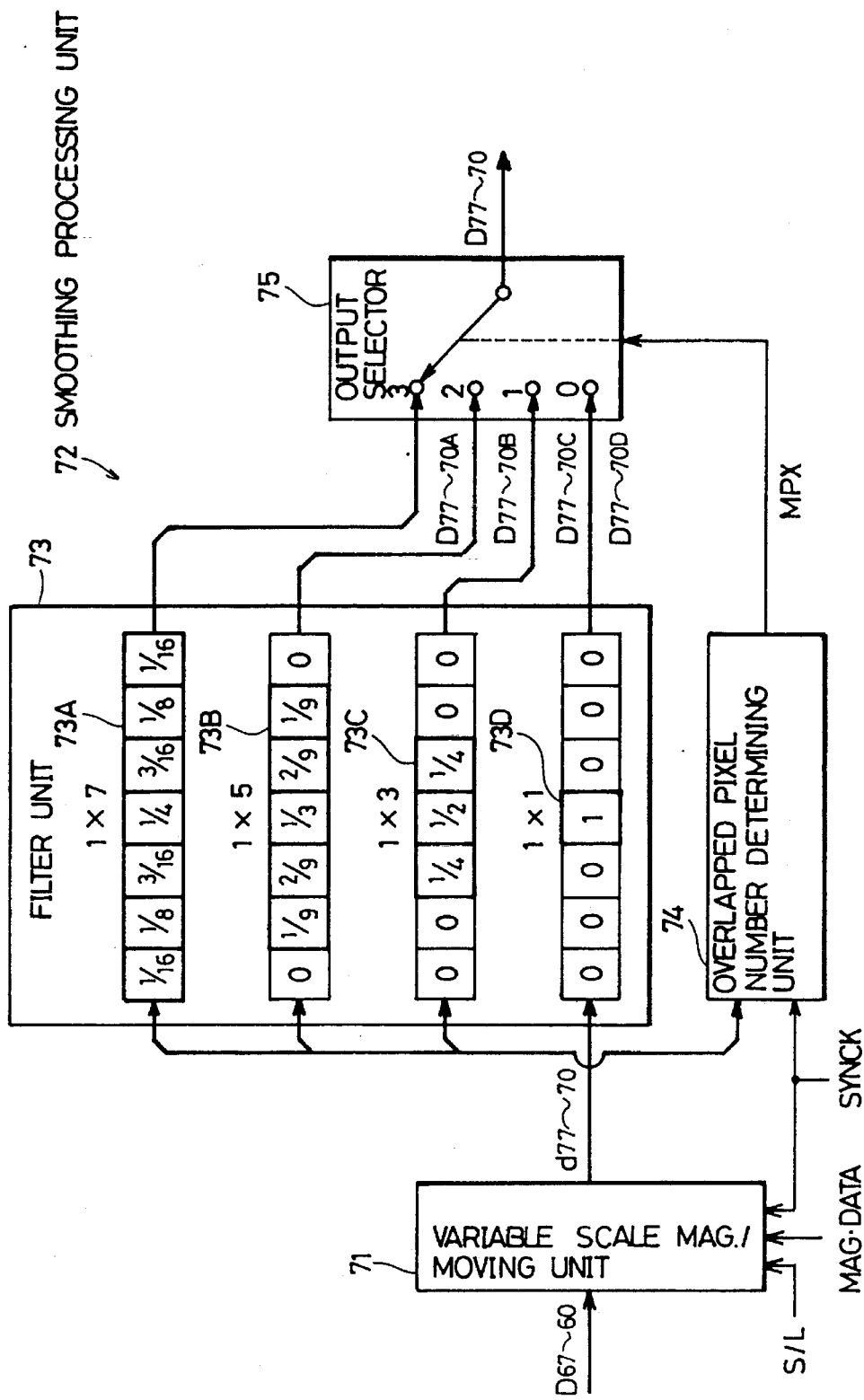
FIG. 1 is a block diagram of a variable scale magnification/edition processing circuit according to a first embodiment of the present invention.

FIG. 1 is a block diagram of a variable scale magnification/edition processing circuit 107 according to a first embodiment of the present invention.

Variable scale magnification/edition processing circuit 107 is comprised of a variable scale magnification/moving unit 71 and a smoothing processing unit 72.

Variable scale magnification/moving unit 71 carries out a variable scale magnification processing for contracting or enlarging an original image by a skipping method or an interpolation method and a moving processing for moving the position of the image with respect to a sheet of paper in the main scanning direction.

Smoothing processing unit 72 is comprised of a filter unit 73, an increased pixel number determining unit 74 and an output selector 75 and outputs image data D77-70 to gamma correction circuit 108 at a succeeding stage.

Filter unit 73 includes four smoothing filters 73A–73D of different matrix sizes. Image data d77-70 output from variable scale magnification/moving unit 71 are smoothed respectively by smoothing filters 73A–73D and then output as image data D77-70A, D77-70B, D77-70C and D77-70D.

In this embodiment, the matrix size of each of smoothing filters 73A–73D is defined as correspondent to a pixel row comprised of odd pixels (2m+1: m=0, 1, 2, 3) in one line. More specifically, the matrix size of smoothing filter 73A corresponds to a so-called 1×7 pixel row, and the respective matrix sizes of other smoothing filters 73B–73D correspond to respective pixel rows of 1×5, 1×3 and 1×1.

In each of smoothing filters 73A–73C, a subject pixel in the center of each pixel row and other adjacent pixels are each provided with an appropriate weighting matrix. In smoothing filter 73D, only a subject pixel is a target to be processed, and the value of weighting matrix is "1". More specifically, smoothing filter 73D outputs input image data d77-70 unchanged as image data D77-70D.

Such smoothing filters 73A–73D are used properly dependently on variable scale magnification R so as to satisfy the following inequality (3), thereby optimizing the smoothing processing.

$$M \geq R \qquad (3)$$

where M is the number of pixels in each pixel row in a variable scale magnification direction (main scanning direction) corresponding to each of smoothing filters 73A–73D and is defined as odd number as described above.

Smoothing filters 73A–73D are constituted by appropriately combining a delay circuit for delaying transmission of data of 8 bits by a one-pixel transmission time, a multiplier using waiting matrix as multiplicator, an adder for adding an output of the multiplier, and the like.

Increased pixel number determining unit 74 determines the number of increased pixels of a subject pixel in accordance with image data d77-70 and applies to output selector 75 a select signal MPX for outputting any of image data D77-70A, B, C, D as image data D77-70.

A further detailed description will now be made on variable scale magnification/moving unit 71 and increased pixel number determining unit 74.

Figure 2:
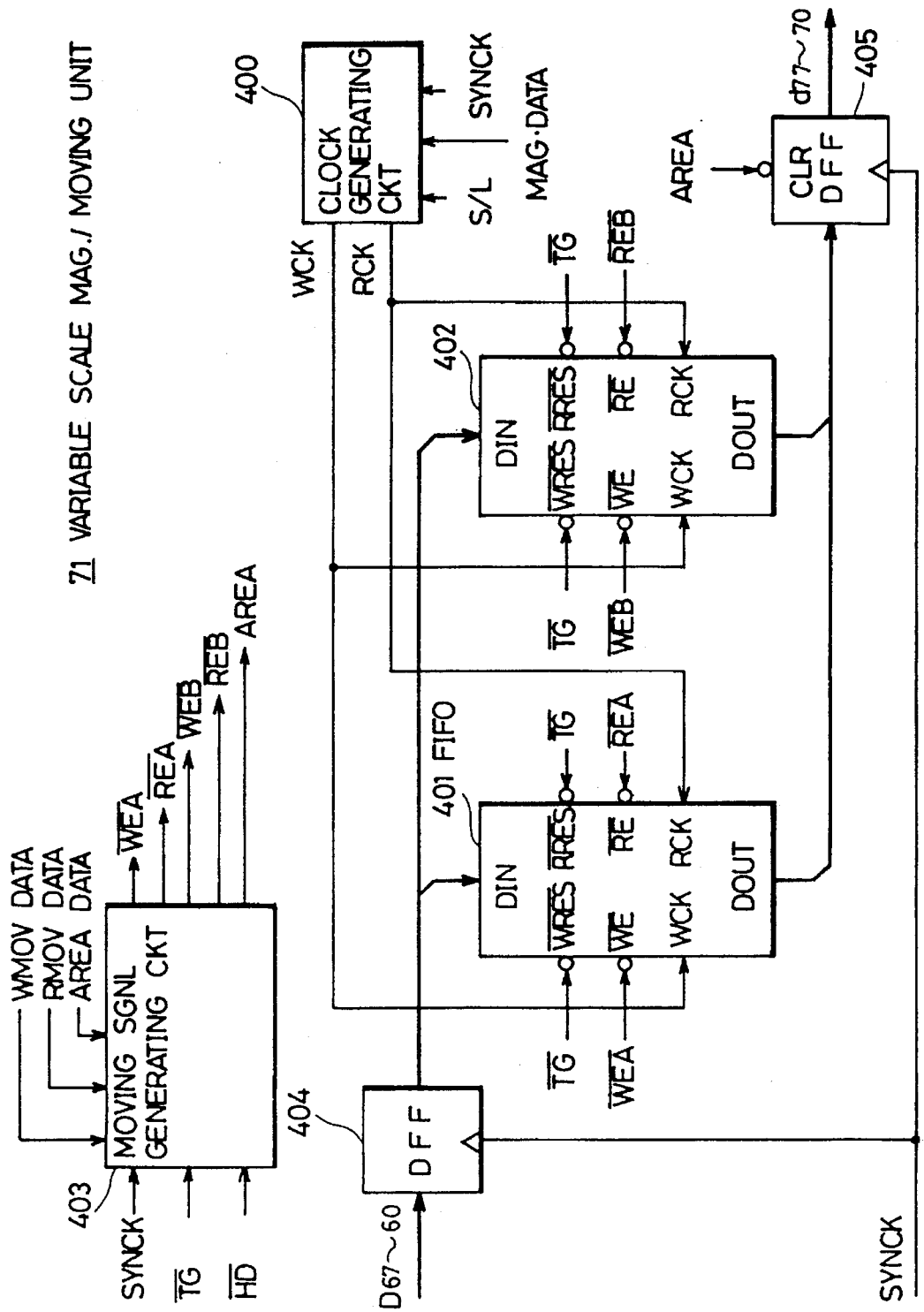
FIG. 2 is a circuit diagram of a variable scale magnification/moving unit.

FIG. 2 is a circuit diagram of variable scale magnification/moving unit 71.

Variable scale magnification/moving unit 71 includes a clock generating circuit 400 for outputting in parallel a write clock signal WCK and a read clock signal RCK, a set of FIFO memories 401 and 402 for alternately writing and reading image data D67-60 which are sequentially input from a preceding stage in a one-line cycle, a moving signal generating circuit 403 for generating various types of control signals for controlling the timing of writing and reading of FIFO memories 401 and 402, and latch circuits 404 and 405 comprised of a D-flipflop for defining input/output timing.

Latch circuits 404 and 405 perform a latching operation in response to a pixel clock signal SYNCK that defines timing of data transmission between respective processing circuits of FIG. 8. Latch circuit 405 outputs valid data only during a period when a signal AREA indicating a valid image area is active.

Figure 3:
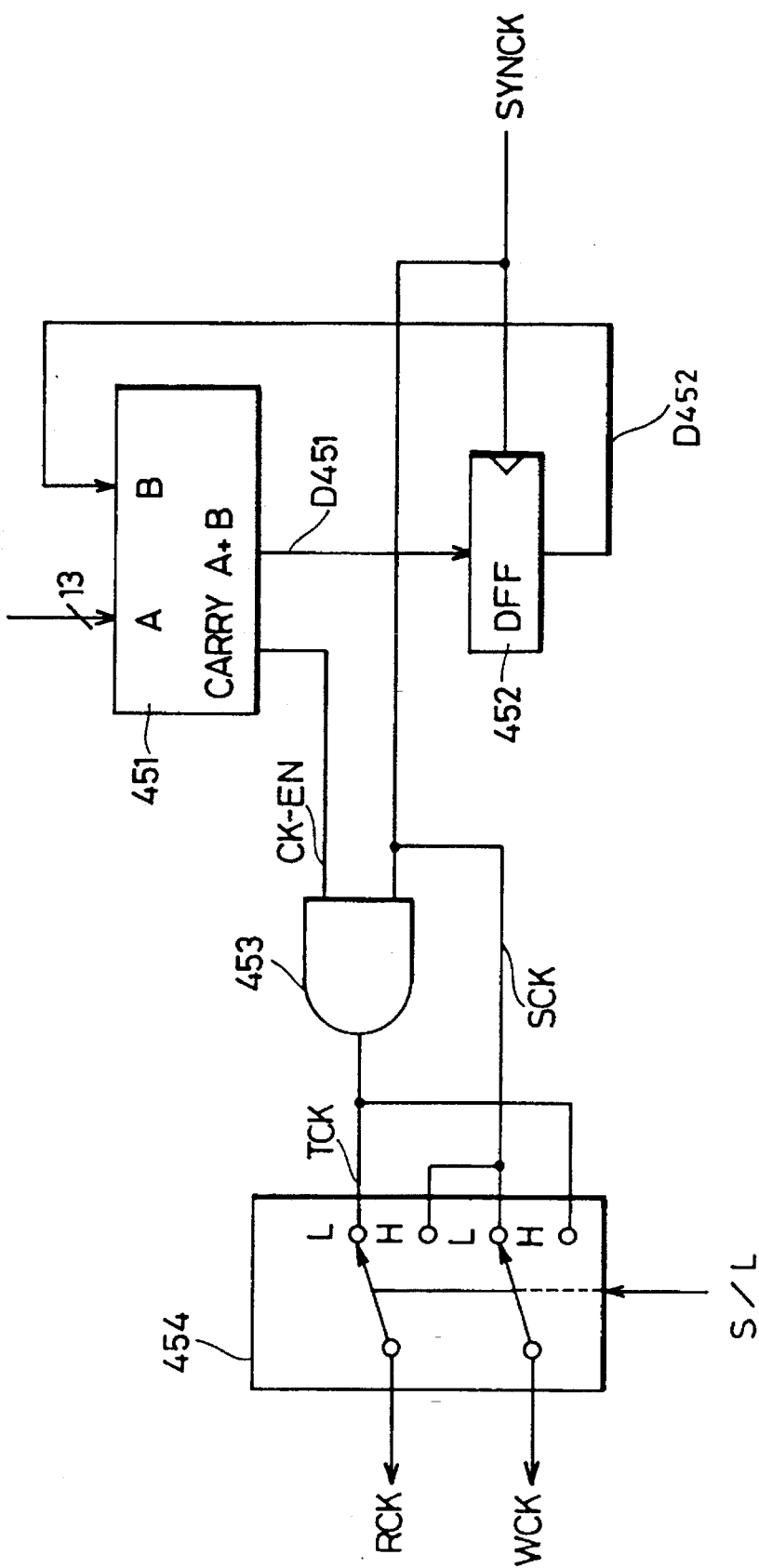
FIG. 3 is a block diagram of a clock generating circuit.

FIG. 3 is a block diagram of clock generating circuit 400.

Clock generating circuit 400 uses the above-described pixel clock signal SYNCK as a standard clock signal SCK and generates a variable scale magnification clock signal TCK which is produced by skipping standard clock signal SCK by an adder 451.

Adder 451 adds data input from respective input terminals A and B and then outputs the result of the addition (A+B) as addition data D451 to a latch circuit 452.

If the result of addition (A+B) is more than a maximum value of adder 451 ("495" is now assumed), adder 451 outputs as addition data D451 a value which is produced by subtracting (maximum value+1) from the addition result (A+B) and then outputs a carry signal CK-EN to a gate circuit 453.

Latch circuit 452 latches addition data D451 output from adder 451 every time when pixel clock signal SYNCK is input, and outputs the latch addition data.

Gate circuit 453 outputs standard clock signal SCK (pixel clock signal SYNCK) as variable scale magnification clock signal TCK only when carry signal CK-EN is applied from adder 451.

Accordingly, if magnification data (MAG·DATA) in accordance with variable scale magnification R is applied from CPU 112 to input terminal A of adder 451, then the applied data MAG·DATA and output data D452 of latch circuit 452 are added together, so that addition data D451 is output.

Addition data D451 is latched by latch circuit 452 at the timing of subsequent pixel clock signal SYNCK and then input as output data D452 to adder 451.

The adding operation by adder 451 and the latch operation by latch circuit 452 are repeated for each pulse of pixel clock signal SYNCK, so that carry signal CK-EN is generated in the proportion corresponding to the ratio of the value of magnification data MAG·DATA to a value ("4096") that "1" is added to the maximum value of adder 451.

This causes gate circuit 453 to skip pixel clock signal SYNCK in the proportion that carry signal CK-EN is generated, thereby generating variable scale magnification clock signal TCK.

When variable scale magnification R is "1", for example, MAG·DATA is "4096" according to the foregoing expression (1). Carry signal CK-EN is output from adder 451 at each timing of pixel clock signal SYNCK. As a result, variable scale magnification clock signal TCK is the same as standard clock signal SCK.

When variable scale magnification R is "2", MAG·DATA is "2048". Carry signal CK-EN is output from adder 451 at alternate timing of generating pixel clock signal SYNCK. Pulses are skipped and disappear in alternate proportion of generating standard clock signal SCK. As a result, variable scale magnification clock signal TCK is of a double cycle of standard clock signal SCK.

Variable scale magnification clock signal TCK thus generated is input together with pixel clock signal SYNCK as standard clock signal SCK into output selector 454.

If the maximum value of adder 451 is set to "4095", variable scale magnification R can be set sufficiently minutely on an approximately 0.1—by—0.1% basis when the maximum value of variable scale magnification R is "4".

Output selector 454 selects one of standard clock signal SCK and variable scale magnification clock signal TCK as write clock signal WCK. At the same time, the selector selects the other as read clock signal RCK.

The selecting operation by output selector 454 is controlled by a variable scale magnification control signal S/L. More specifically, when a contracted image is formed, variable scale magnification control signal S/L attains a logic high level. At this time, output selector 454 outputs variable scale magnification clock signal TCK as write clock signal WCK. At the same time, the selector outputs standard clock signal SCK as read clock signal RCK.

When an enlarged image is formed, variable scale magnification control signal S/L attains a logic low level. At this time, output selector 454 outputs standard clock signal SCK as write clock signal WCK. At the same time, the selector outputs variable scale magnification clock signal TCK as read clock signal RCK.

FIFO memories 401 and 402 are accessed in response to those clock signals WCK and RCK having a different number of pulses per unit time, whereby image data d77-70 corresponding to a variable scale magnified image is generated.

Figure 4:
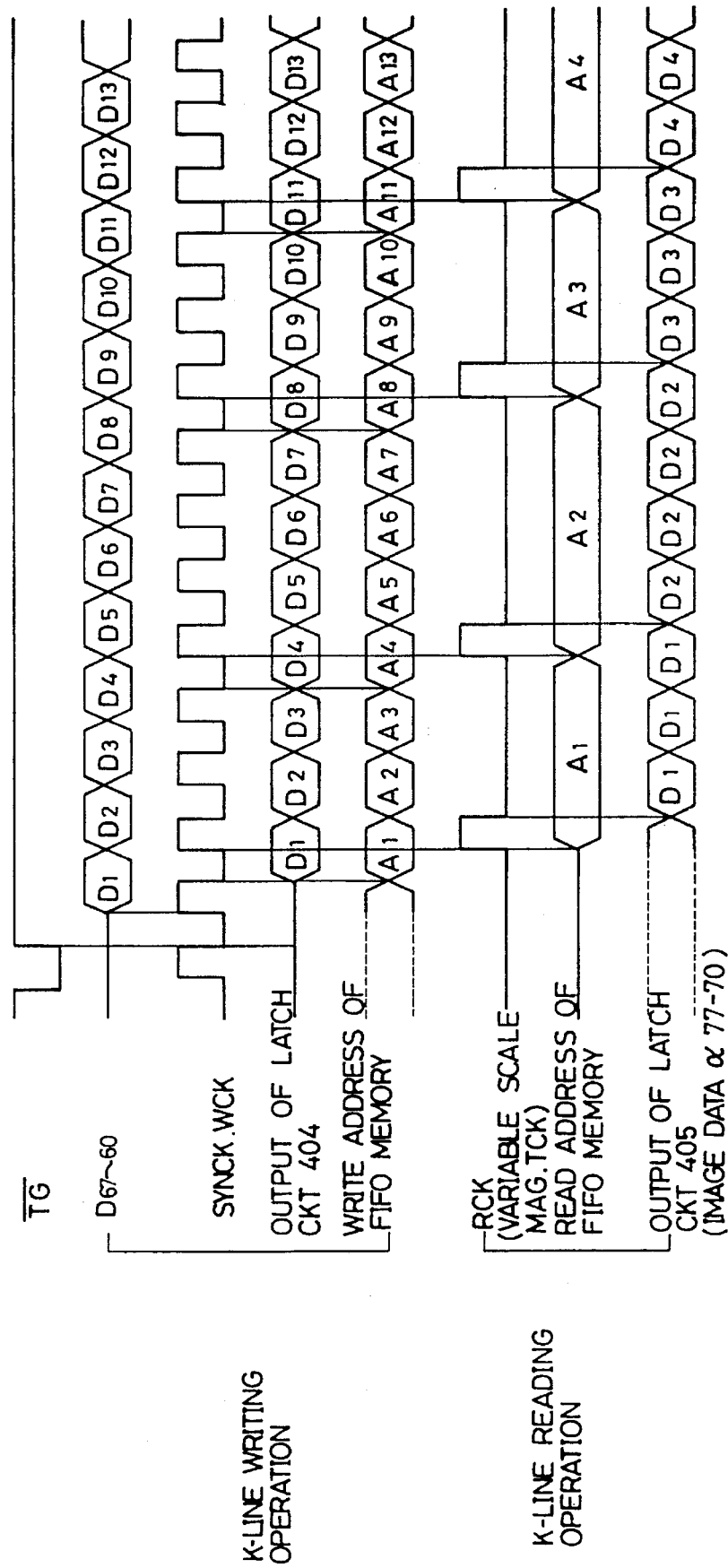
FIG. 4 is a time chart showing a variable scale magnification processing in enlargement.

FIG. 4 is a time chart showing a variable scale magnification processing in enlargement.

In FIG. 4, writing and reading of image data D67-60 corresponding to a single line are shown in conformity with one pulse edge of a horizontal synchronizing enable signal TG. However, the reading and writing for a single line are actually carried out alternately for each line cycle.

A description will now be made on, for example, formation of an enlarged image with variable scale magnification R of "3.5" with reference to FIGS. 2 and 4. Clock generating circuit 400 repeats an operation of first skipping two pulses of pixel clock signal SYNCK and leaving one pulse, then skipping three pulses and leaving one pulse, i.e., an operation of alternately leaving one pulse for every three pulses and for every four pulses, thereby generating variable scale magnification clock signal TCK.

Then, clock generating circuit 400 outputs the generated variable scale magnification clock signal TCK as read clock signal RCK, while it outputs standard clock signal SCK, i.e., pixel clock signal SYNCK as write clock signal WCK.

Latch circuit 404 latches image data D67-60 that is input in the order of arrangement of pixels in the main scanning direction from the preceding stage in response to pixel clock signal SYNCK for each pixel.

For processing of odd lines, for example, data Dj (j=1, 2, 3 . . . ) corresponding to each pixel latched in latch circuit 404 is written into FIFO memory 401.

At that time, since write clock signal WCK is identical to pixel clock signal SYNCK, a write address Aj (j=1, 2, 3 . . .) of FIFO memory 401 is incremented in accordance with pixel clock signal SYNCK, so that all of data Dj corresponding to one line is written into FIFO memory 401.

However, since reading from FIFO memory 401 is carried out in response to variable scale magnification clock signal TCK which has pulses one third or one fourth those of pixel clock signal SYNCK, odd addresses are designated as 3 cycles of pixel clock signal SYNCK, while even addresses are designated as 4 cycles of pixel clock signal SYNCK.

Accordingly, latch circuit 405 outputs image data D77-70 in which odd pixels are increased three by three and even pixels are increased four by four in response to pixel clock signal SYNCK.

If an image is formed in accordance with image data d77-70 thus generated, a copied image which is enlarged 3.5 times as large as the original image in the main scanning direction is obtained. An enlargement of the copied image in the subscanning direction is achieved by decreasing scanning speed in the subscanning direction upon reading original D. That is to say, if scanning speed in equal scale magnification is set to V (mm/sec), scanning speed at variable scale magnification R is set to V/R (mm/sec).

Figure 5:
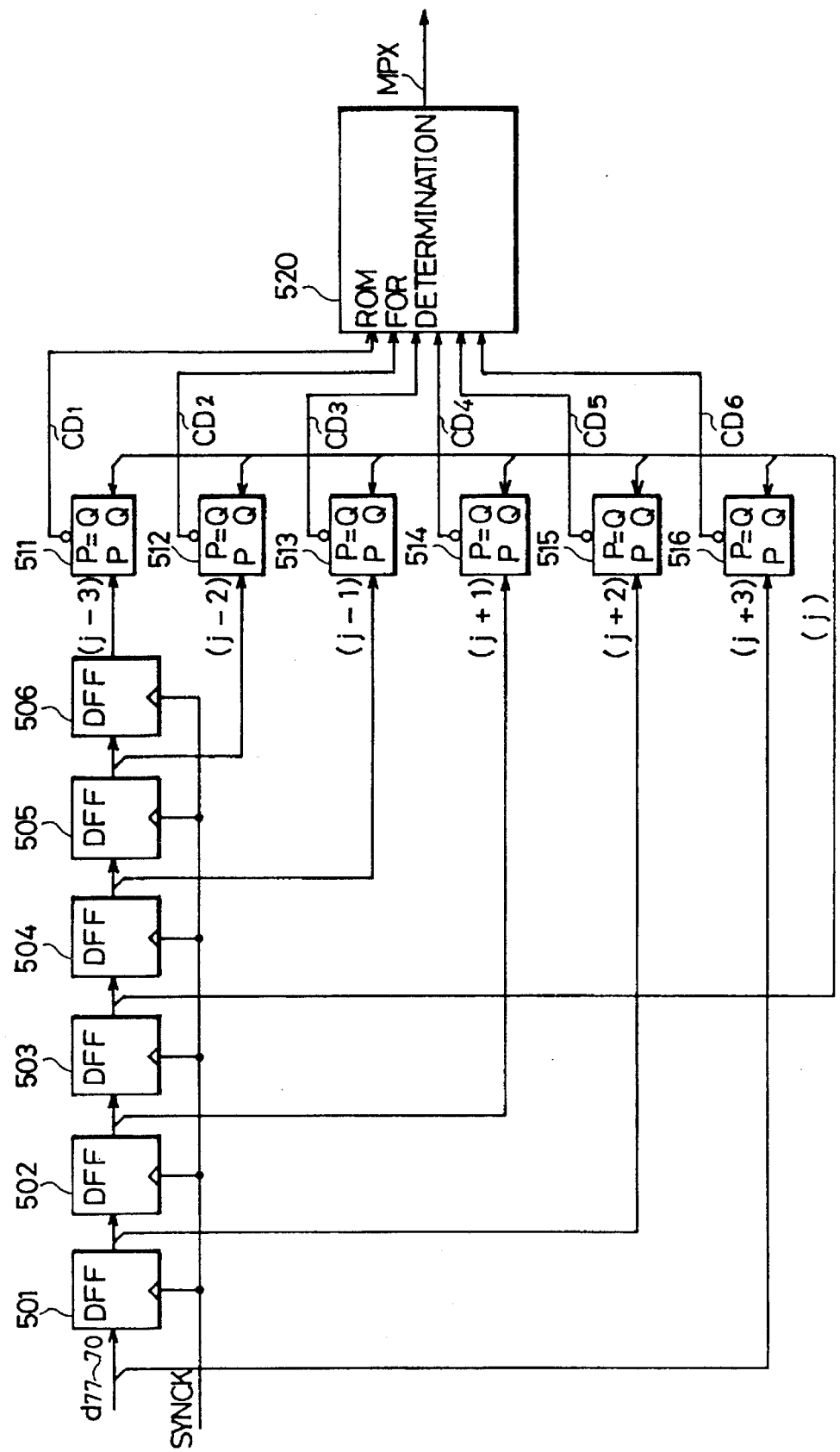
FIG. 5 is a circuit diagram of an increased pixel number determining unit of FIG. 1.

FIG. 5 is a circuit diagram of increased pixel number determining unit 74.

Increased pixel number determining unit 74 is comprised of delay circuits 501–506, comparison circuits 511–516 and an ROM 520 for determination.

Delay circuits 501–506 each include eight D flipflops and sequentially delay pixel by pixel 8-bit image data d77-70 input from variable scale magnification/moving unit 71. An output of third delay circuit 503 corresponds to a subject pixel (j) for smoothing processing.

Comparison circuits 511–516 each have 8-bit data comparison capabilities and compare subject pixel (j) with its adjacent pixels (j±n: n=1, 2, 3). Comparison circuits 511–516 output comparison data CD1–CD6 that attain "0" when the respective values of those pixels match each other and "1" when the respective values thereof do not match each other.

Determination ROM 520 outputs a select signal MPX corresponding to combinations of the respective values of comparison data CD1–CD6 on the basis of a determination table JT stored in advance.

FIG. 6 is a diagram showing the content of determination table JT. In FIG. 6, a symbol "=" denotes that the value of any adjacent pixel matches that of the subject pixel, "≠" denotes that the value of any adjacent pixel does not match that of the subject pixel, and "–" denotes that it is arbitrary whether or not the value of any adjacent pixel matches that of the subject pixel.

Therefore, the value of comparison data CD1–CD6 corresponding to any adjacent pixel denoted with symbol "=" or "≠" is "0" or "1".

For example, if the respective values of six adjacent pixels (j±n) in total on opposite sides of subject pixel (j), i.e., three pixels on each side thereof are equal to the value of subject pixel (j), that is, seven pixels of the same value including subject pixel (j) are arranged in the main scanning direction, all comparison data CD1–CD6 are "0". It is determined that subject pixel (j) is a pixel that the number of increased pixels is "7", and the value of select signal MPX is "3".

Accordingly, as shown in FIG. 1, output selector 75 selects image data D77-70A that is generated by smoothing image data d77-70 by smoothing filter 73A of 1×7 in matrix size is selected as image data D77-70 to be output. Also, when the number of increased pixels for subject pixel (j) is "6", the value of select signal MPX is "3".

When the number of increased pixels is "5" or "4", the value of select signal MPX is "2". In this case, image data D77-70B corresponding to smoothing filter 73B of 1×5 in matrix size is selected as an output.

When the number of increased pixels is "3" or "2", the value of select signal MPX is "1", and image data D77-70C corresponding to smoothing filter 73C of 1×3 in matrix size is selected as an output.

When the number of increased pixel is "1", i.e., an equal-scale magnified image is formed, the value of select signal MPX is "0". In this case, image data D77-70D that is not substantially subjected to smoothing processing, i.e., image data D77-70D identical to input image data d77-70 is selected as an output.

Therefore, in variable scale magnification/edition circuit 107 of this embodiment, when variable scale magnification R is decimal "3.5" and an enlarged image incorporates pixels with the number of increased pixels being "3" and pixels with the number of increased pixels being "4" together, the following processing is carried out. The pixels with the number of increased pixels being "3" are smoothed by smoothing filter 73C of 1×3 in matrix size, while those with the number being "4" are smoothed by smoothing filter 73B of 1×5 in matrix size.

In other words, in formation of a sheet of an enlarged image, a conventional uniform smoothing in accordance with variable scale magnification R is not carried out, but smoothing is carried out by properly using smoothing filter 73B or 73C dependently on the number of increased pixels.

This suppresses an excessive or insufficient smoothing to a minimum extent, resulting in a high definition enlarged image with excellent tone.

Figure 9:
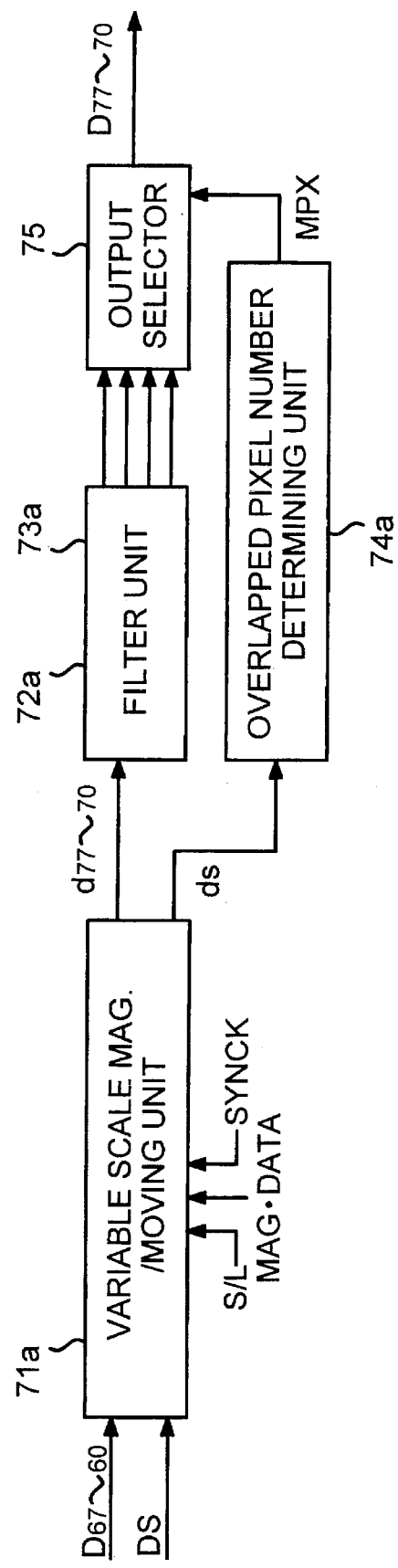
FIG. 9 is a block diagram of a variable scale magnification/edition processing circuit according to a second embodiment of the present invention.
Figure 10:
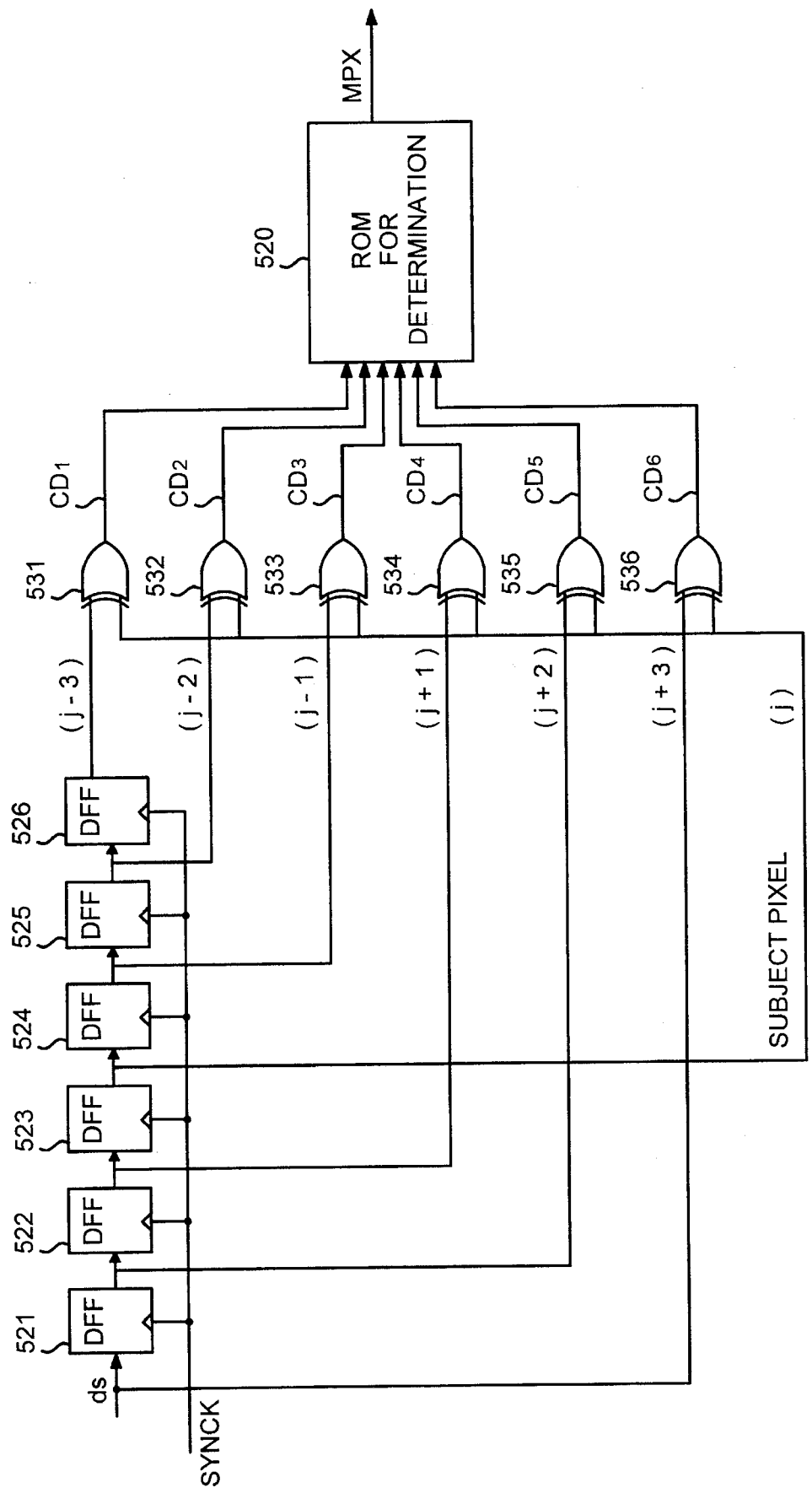
FIG. 10 is a circuit diagram of an increased pixel number determining unit of FIG. 9.
Figure 11:
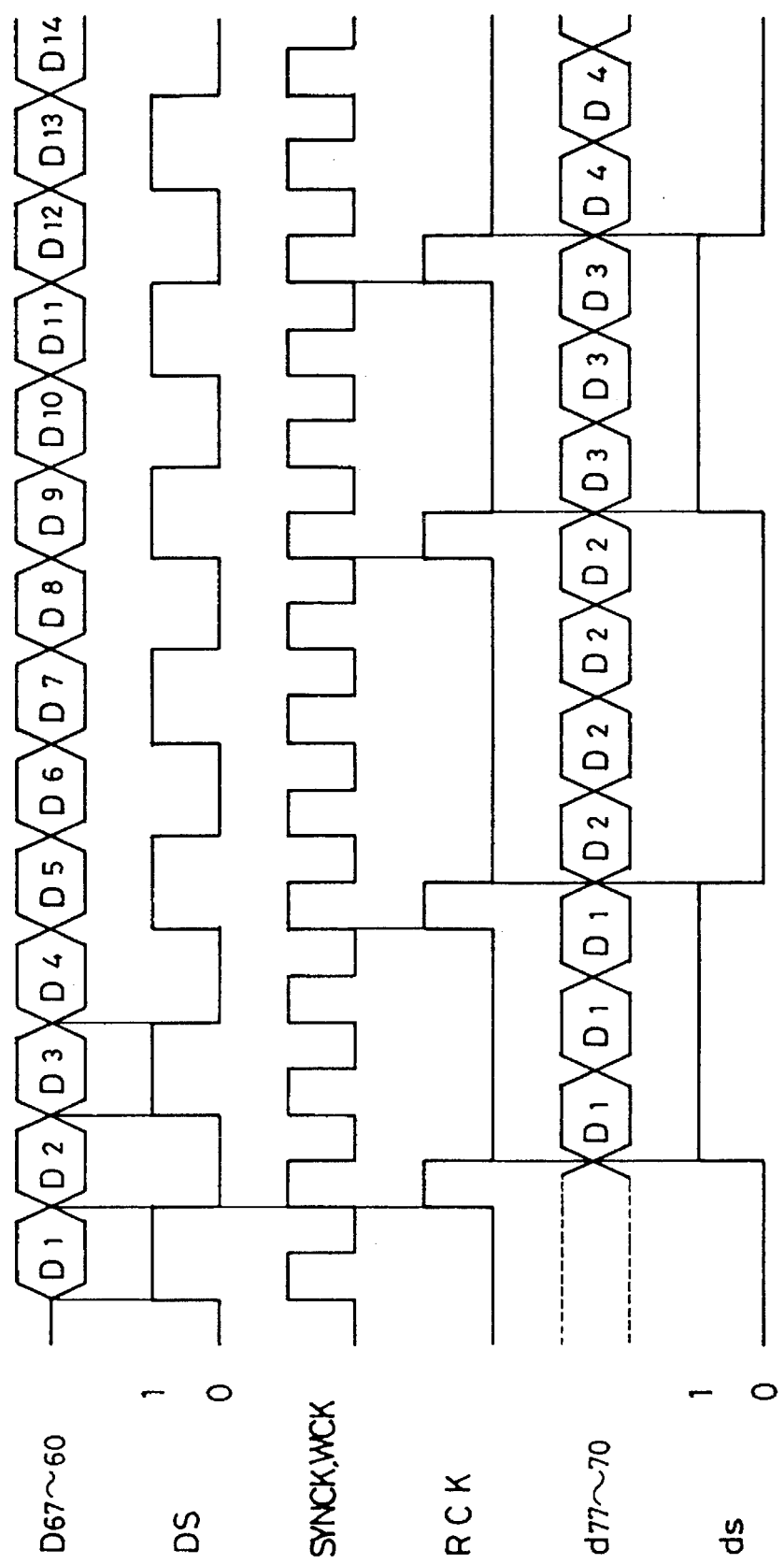
FIG. 11 is a time chart showing an operation of a variable scale magnification/moving unit of FIG. 9.

FIG. 9 is a block diagram of a variable scale magnification/edition processing circuit 107a according to a second embodiment of the present invention; FIG. 10 is a circuit diagram of an increased pixel number determining unit 74a of FIG. 9; and FIG. 11 is a time chart showing an operation of a variable scale magnification/moving unit 71a of FIG. 9. In FIGS. 9, 10 and 11, constituent elements having the same function as those of FIGS. 1, 4 and 5 are denoted with like reference characters.

Variable scale magnification/edition processing circuit 107a is comprised of variable scale magnification/moving unit 71a and a smoothing processing unit 72a.

Variable scale magnification/moving unit 71a is provided with sign data DS as an input. Sign data DS is a one-bit data signal, the status value of which is inverted into "0" or "1" in synchronization with a pixel clock signal SYNCK. Sign data DS along with image data D67-60 undergoes a variable scale magnification processing in variable scale magnification/moving unit 71a.

By the variable scale magnification processing, sign data DS is converted into sign data dS, the status value of which is inverted to "0" or "1" dependently on the number of increased pixels of data Dj corresponding to each pixel.

Increased pixel number determining unit 74a is comprised of delay circuits 521–526, comparison circuits 531–536 and an ROM 520 for determination.

Delay circuits 521–526 are each comprised of a single D-flipflop and sequentially delays pixel by pixel one-bit sign data dS input from variable scale magnification/moving unit 71a. An output of third delay circuit 523 corresponds to a subject pixel (j) for smoothing processing.

Comparison circuits 531–536 each include a single exclusive OR element, makes a comparison between sign data dS corresponding to subject pixel (j) and sign data dS corresponding to its adjacent pixels (j±n: n=1, 2, 3) and outputs comparison data CD1–CD6 indicating whether both values match each other or not. ROM 520 for determination outputs a select signal MPX based on the foregoing determination table JT in accordance with the value of comparison data CD1–CD6.

Four smoothing filters of the same matrix size as that of smoothing filters 73A–73D of FIG. 1 are provided in a filter unit 73a. All waiting matrixes of those smoothing filters are "1".

Accordingly, filter unit 73a outputs image data D77-70A, B, C, D that is generated by subjecting input image data d77-70 of a pixel row corresponding to a selected matrix size to a simple mean processing.

As a matter of course, when the number of increased pixels is "1", i.e., in the case of equal scale magnification, the value of select signal MPX is "0", and no smoothing processing is substantially provided.

In variable scale magnification/edition processing circuit 107a, even if pixels of the same density are adjacent with each other in an original image, the number of increased pixels by the variable scale magnification. processing can be accurately determined, thereby enabling a smoothing processing of an appropriate matrix size in accordance with variable scale magnification R.

That is to say, when adjacent pixels of the same density are included in the original image, pixels of the same value are arranged in image data d77-70 subjected to the variable scale magnification processing even in the case of equal scale magnification copying. In increased pixel number determining unit 74 shown as the first embodiment, however, since the number of increased pixels of the subject pixel is determined in accordance with image data d77-70, those pixels are also detected as the number of increased pixels, so that the precise number of increased pixels cannot be detected.

On the other hand, in increased pixel number determining unit 74a shown as the second embodiment, since the number of increased pixels is determined based on sign data dS, the value of which is inverted for each pixel independently of image data d77-70, the number of increased pixels can accurately be determined.

Thus, when pixels are increased in the original image, the number of increased pixels is not excessively detected by increased pixel number determining unit 74a. In equal scale magnification or contraction in particular, such an error can be avoided that a smoothing processing in accordance with an excessively large filter size deteriorates image quality.

Further, while increased pixel number determining unit 74 shown in FIG. 5 as the first embodiment delays and compares 8-bit image data d77-70, increased pixel number determining unit 74a shown as the second embodiment delays and compares one-bit sign data dS. This results in a simpler and less expensive circuit configuration.

Figure 12:
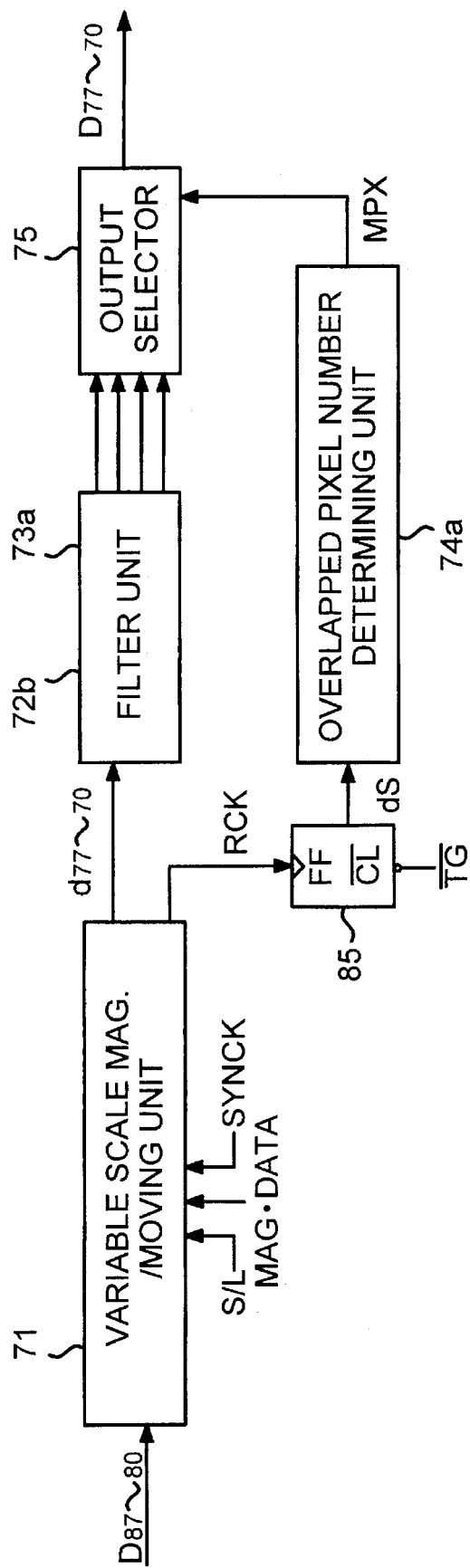
FIG. 12 is a block diagram of a variable scale magnification/edition processing circuit according to a third embodiment of the present invention.
Figure 13:
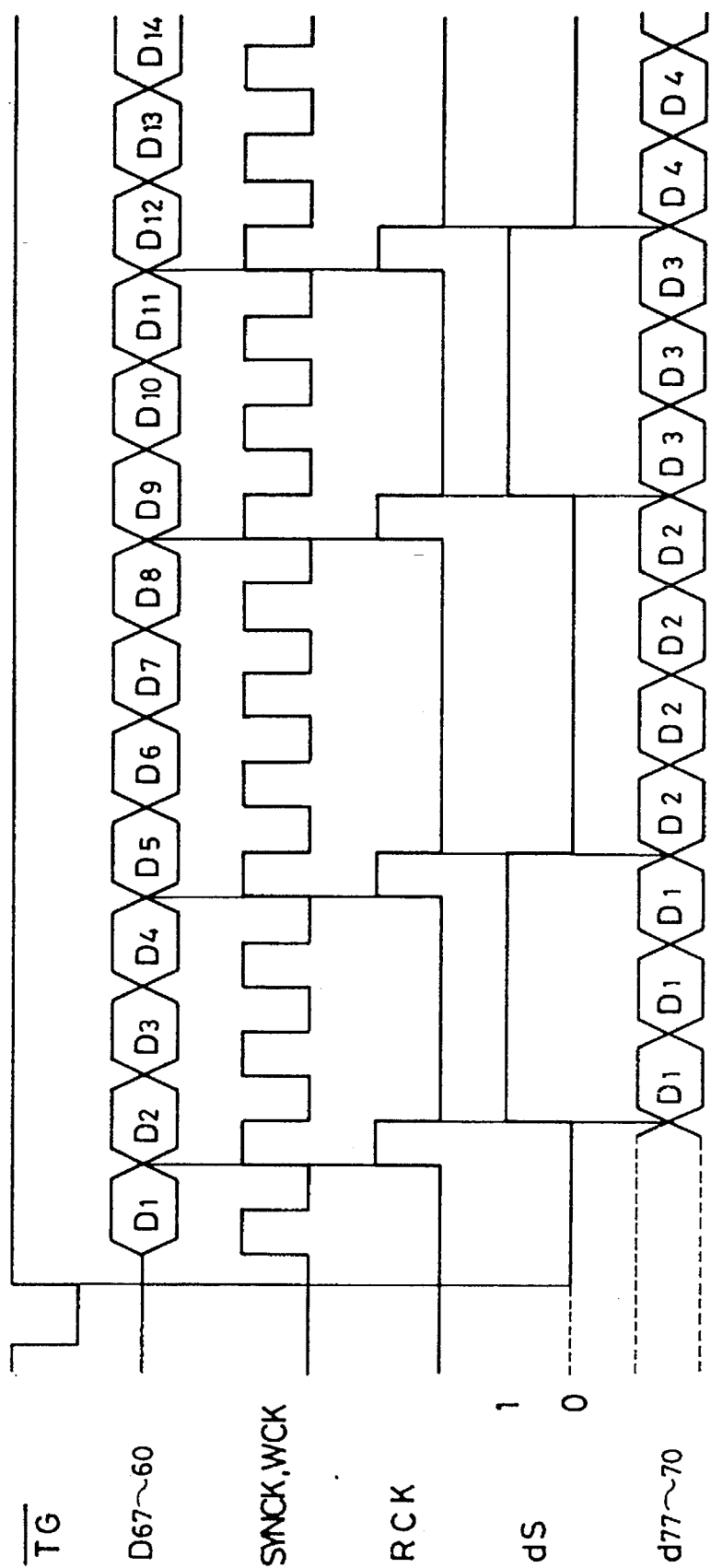
FIG. 13 is a time chart showing an operation of the variable scale magnification/edition processing circuit of FIG. 12.

FIG. 12 is a block diagram of a variable scale magnification/edition processing circuit 107b according to a third embodiment of the present invention; and FIG. 13 is a time chart showing an operation of variable scale magnification/edition processing circuit 107b of FIG. 12.

Variable scale magnification/edition processing circuit 107b is comprised of a variable scale magnification/moving unit 71 and a smoothing processing unit 72b.

A pulse generating circuit 85 for generating sign data dS is provided in smoothing processing unit 72b.

Pulse generating circuit 85 has its output cleared in response to an input to its CL terminal and is comprised of a T-flipflop which has an output inverted every time an input pulse falls.

Accordingly, pulse generating circuit 85 responds to a read clock signal RCK output from a clock generating circuit 400 in variable scale magnification/moving unit 71 to generate sign data dS, the status value of which is inverted into "0" or "1" at the timing that read clock signal RCK falls.

Further, in order to determine an initial status value of sign data dS output from pulse generating circuit 85, the status value of sign data dS is cleared to "0" by a horizontal synchronizing enable signal TG that is initially output for each line.

In variable scale magnification/edition processing circuit 107b of the third embodiment, sign data dS can easily be generated from read clock signal RCK by provision of pulse generating circuit 85 comprised of a T-flipflop.

This makes it possible to accurately determine the number of increased pixels by increased pixel number determining unit 74a and avoid an error that an image quality is degraded due to an excessively large filter size, thereby realizing a further simpler and less expensive circuit configuration.

The description has been made on the case where image data d77-70 corresponding to an enlarged image is smoothed by employing smoothing filters 73A–73D corresponding to pixel rows of one line, in the foregoing embodiments. Alternatively, a smoothing processing may be carried out by smoothing filters of k×L (k, L is arbitrary odd number) over a plurality of lines in matrix size.

In the foregoing embodiments, other various modifications or alterations can be made on clock generating circuit 400, pulse generating circuit 75, increased pixel number determining units 74 and 74a and filter unit 73 as well as smoothing processing units 72, 72a and 72b, variable scale magnification/moving units 71 and 71a, variable scale magnification/edition processing circuits 107, 107a and 107b, signal processing unit 100 and the configuration of each unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for processing image data including a number of pixel data, comprising:

enlarging means for increasing the number of pixel data by repeating respective pixel data a number of repeat times to enlarge an image, wherein the number of said repeat times is determined for each of said pixel data;

a plurality of smoothing filters which have different matrix sizes in one dimension from each other; and smoothing means for selecting, individually for each of said pixel data, one of said smoothing filters in accordance with said number of the repeat times of each of said pixel data, said selected smoothing filter having a matrix size in said one dimension which is not less than the said number of the repeat times, and for filtering each of said pixel data by using said selected smoothing filter, wherein the smoothing means includes means for selecting different smoothing filters for different pixels within the same image in accordance with said number of the repeat times.

2. The image processing apparatus according to claim 1, further comprising:

input means for inputting an enlarging rate; and determining means for determining said number of the repeat times for each of said pixel data in accordance with said enlarging rate input by said input means, wherein said enlarging means increases the number of said pixel data in accordance with said number of repeat times determined by said determining means, and said smoothing means selects said smoothing filter in accordance with said determined number of the repeat times.

3. The image processing apparatus according to claim 1, wherein said smoothing filters have different intensities of smoothing from each other.

4. The image processing apparatus of claim 1, further comprising an image data input means for inputting image data.

5. The image processing apparatus of claim 1, further comprising a memory, wherein the memory contains image data.

6. The image processing apparatus of claim 1, wherein the enlarging means comprises a variable scale magnification unit having a clock generating circuit and a memory.

7. The image processing apparatus of claim 1, wherein the enlarging means enlarges the image by a noninteger multiple.

8. An image processing apparatus for processing image data including a number of pixel data, comprising:

enlarging means for increasing the number of pixel data by repeating respective pixel data a number of repeat times to enlarge an image, wherein the number of said repeat times is determined for each of said pixel data;

a plurality of smoothing filters for filtering one of said pixel data which corresponds to a central pixel with reference to pixel data which correspond to a plurality of peripheral pixels adjacent to said central pixel, wherein each of said plural smoothing filters refers to a different number of peripheral pixels; and smoothing means for selecting, individually for each of said pixel data, one of said smoothing filters in accordance with said number of the repeat times of each of said pixel data, said selected smoothing filter referring to a number of peripheral pixels which is not less than the number of repeat times, and for filtering each of said pixel data by using said selected smoothing filter, wherein the smoothing means includes means for selecting different smoothing filters for different pixels within the same image in accordance with said number of the repeat times.

9. The image processing apparatus of claim 8, wherein the enlarging means enlarges the image by a noninteger multiple.

10. An image processing method for enlarging image data including a number of pixel data at an arbitrary enlarging rate, comprising the steps of:

repeating each of said pixel data a plural number of repeat times corresponding to said enlarging rate, wherein said number of repeat times is determined for each of said pixel data;

detecting the plural number of repeat times for each of said pixel data;

selecting, individually for each of said pixel data, a smoothing filter having a size in one dimension which is not less than said number of repeat times for each of said pixel data, wherein different smoothing filters may be selected for different pixels within the same image and in accordance with said number of repeat times of each of said pixel data; and correcting an intensity value of each of said pixel data by referring to pixel data adjacent to said pixel data to be corrected by using said selected smoothing filter.

11. The image processing method of claim 10, wherein the arbitrary enlarging rate has a noninteger multiple.

12. The image processing method of claim 10, further comprising the step of outputting image data of an enlarged size document with corrected intensity values for each pixel.

13. The image processing method of claim 12, further comprising the step of inputting image data from an original size document including a number of pixel data.

14. An image processing system comprising:

means for magnifying pixel data by repeating respective pixel data a number of times equal to a magnification factor M, wherein M is determined for each pixel;

a plurality of smoothing filters of different matrix sizes; and means for selecting individually for each of said pixel data, a different one of said smoothing filters in accordance with the number of repeat times of each of said pixel data having a matrix size m×n, where at least one of m and n is not less than M to smooth said repeated pixel data.

15. The image processing system of claim 14, wherein said at least one of m and n satisfy the following relationship:

$$M \leq (m \text{ or } n) \leq M+1.$$

* * * * *